(12) United States Patent
Maeda

(10) Patent No.: US 12,739,336 B2
(45) Date of Patent: Sep. 15, 2026

(54) IMAGE PROCESSING APPARATUS AND METHOD FOR PROCESSING AN IMAGE WITH SWITCHABLE FUNCTIONS

(71) Applicant: BROTHER KOGYO KABUSHIKI KAISHA, Nagoya (JP)

(72) Inventor: Takashi Maeda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 38 days.

(21) Appl. No.: 18/415,824

(22) Filed: Jan. 18, 2024

(65) Prior Publication Data

US 2024/0291928 A1 Aug. 29, 2024

(30) Foreign Application Priority Data

Feb. 27, 2023 (JP) ................................ 2023-028791

(51) Int. Cl.
*H04N 1/32* (2006.01)
*H04N 1/00* (2006.01)
*H04N 1/21* (2006.01)

(52) U.S. Cl.
CPC ..... *H04N 1/32512* (2013.01); *H04N 1/00389* (2013.01); *H04N 1/00689* (2013.01); *H04N 1/00694* (2013.01); *H04N 1/00822* (2013.01); *H04N 1/00896* (2013.01); *H04N 1/2158* (2013.01)

(58) Field of Classification Search
CPC ........... H04N 1/32512; H04N 1/00689; H04N 1/00694; H04N 1/00795–00827; H04N 1/00896; H04N 1/2158
See application file for complete search history.

(56) References Cited

U.S. PATENT DOCUMENTS

2007/0216968 A1* 9/2007 Enomoto ........... H04N 1/32496 358/498
2009/0019191 A1* 1/2009 Ito ..................... H04N 1/00482 710/36
2011/0085205 A1* 4/2011 Ouchi .................. G06F 3/1221 358/1.15
2011/0249306 A1* 10/2011 De Muelenaere . H04N 1/00222 358/498

(Continued)

FOREIGN PATENT DOCUMENTS

JP 2007251781 A 9/2007
JP 2016009901 A 1/2016

(Continued)

*Primary Examiner* — Nicholas Pachol
(74) *Attorney, Agent, or Firm* — Scully, Scott, Murphy & Presser, P.C.

(57) ABSTRACT

An image processing apparatus includes an operation receiver configured to receive a predetermined operation, a first communication interface connectable with an external device, and a controller. The controller is configured to, in response to the operation receiver receiving the predetermined operation when the first communication interface is not connected with the external device, perform a first imaging process, and in response to the operation receiver receiving the predetermined operation when the first communication interface is connected with the external device, perform a second imaging process using the external device. The second imaging process is different from the first imaging process.

16 Claims, 12 Drawing Sheets

(56) References Cited

U.S. PATENT DOCUMENTS

| | | | | |
|---|---|---|---|---|
| 2015/0156363 | A1* | 6/2015 | Takamiya | G06F 1/3228 358/1.14 |
| 2015/0249767 | A1* | 9/2015 | Utsumi | H04N 1/00551 358/1.14 |
| 2020/0304659 | A1 | 9/2020 | Hattori | |
| 2020/0389567 | A1* | 12/2020 | Kumahashi | H04N 1/00331 |
| 2024/0114098 | A1* | 4/2024 | Sakai | H04N 1/00482 |

FOREIGN PATENT DOCUMENTS

| | | | |
|---|---|---|---|
| JP | 2018045242 | A | 3/2018 |
| JP | 2018129646 | A | 8/2018 |
| JP | 2020155890 | A | 9/2020 |

* cited by examiner

IMAGE PROCESSING APPARATUS AND METHOD FOR PROCESSING AN IMAGE WITH SWITCHABLE FUNCTIONS

REFERENCE TO RELATED APPLICATIONS

This application claims priority from Japanese Patent Application No. 2023-028791 filed on Feb. 27, 2023. The entire content of the priority application is incorporated herein by reference.

BACKGROUND ART

An image processing apparatus, in which a user may create a shortcut to a specific function by assigning the specific function to an unused shortcut button in advance, is known. The user may operate the image processing apparatus to perform the specific function linked with the shortcut button by using the shortcut button.

DESCRIPTION

In order to operate the image processing apparatus to function differently, the user may need to create a plurality of shortcuts by assigning a plurality of shortcut buttons to a plurality of functions one by one in advance, but the work to create the plurality of shortcuts may be complicated and burden to the user.

The present disclosure is advantageous in that an image processing apparatus and a method for image processing, by which a user may cause an image processing apparatus to process images differently in response to different operations received from the user, are provided.

FIRST EMBODIMENT

Configuration of Image Processing Apparatus 1

Figure 1A:
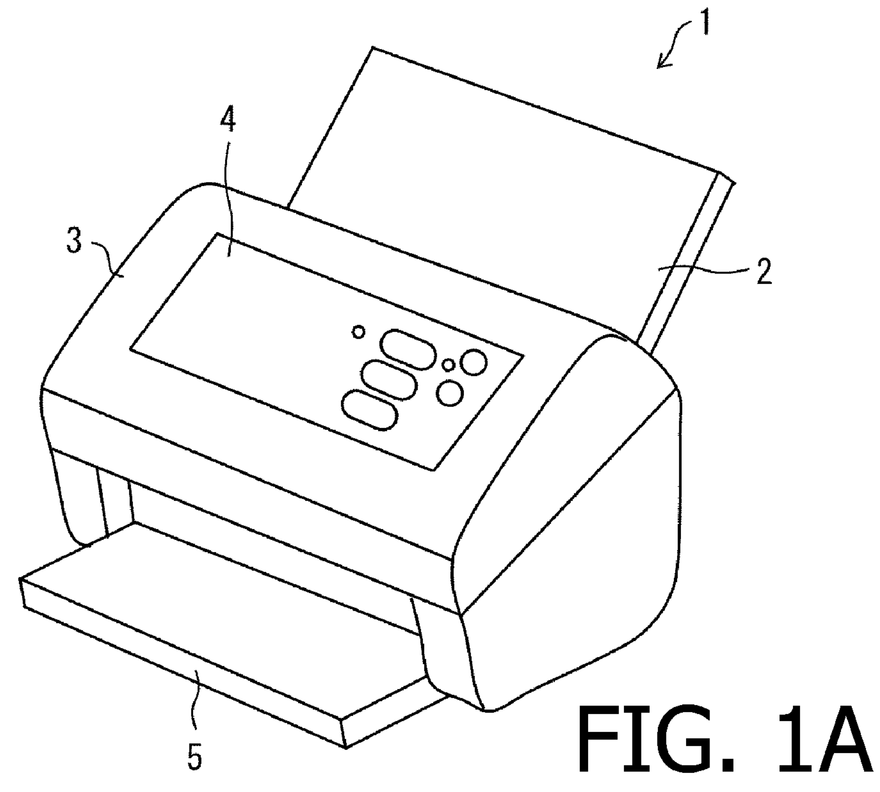
FIG. 1A is a frontward perspective view of an image processing apparatus.
Figure 1B:
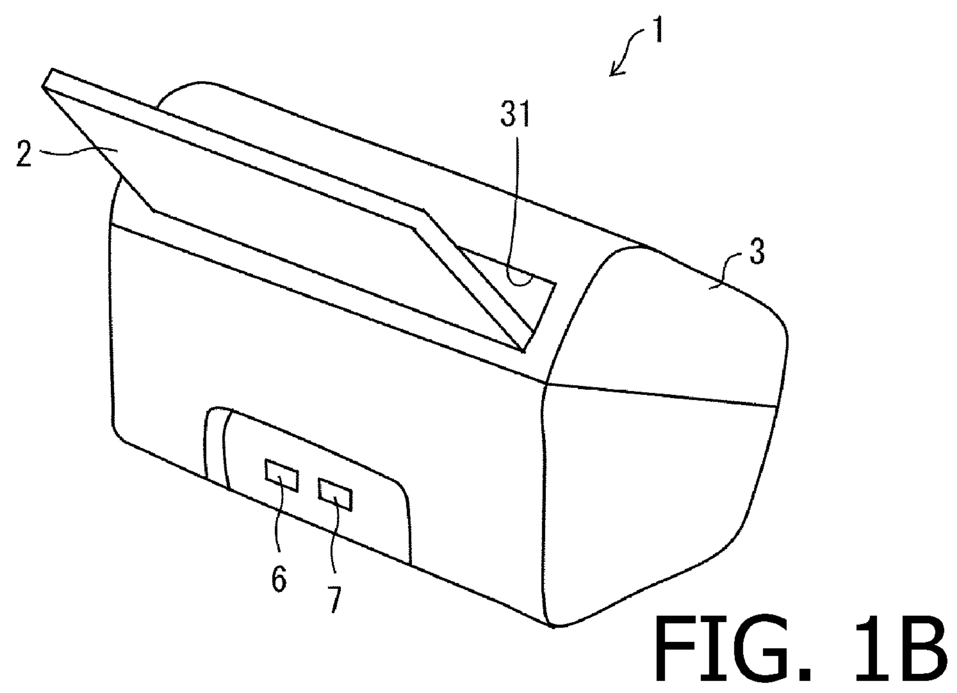
FIG. 1B is a rearward perspective view of the image processing apparatus.
Figure 2:
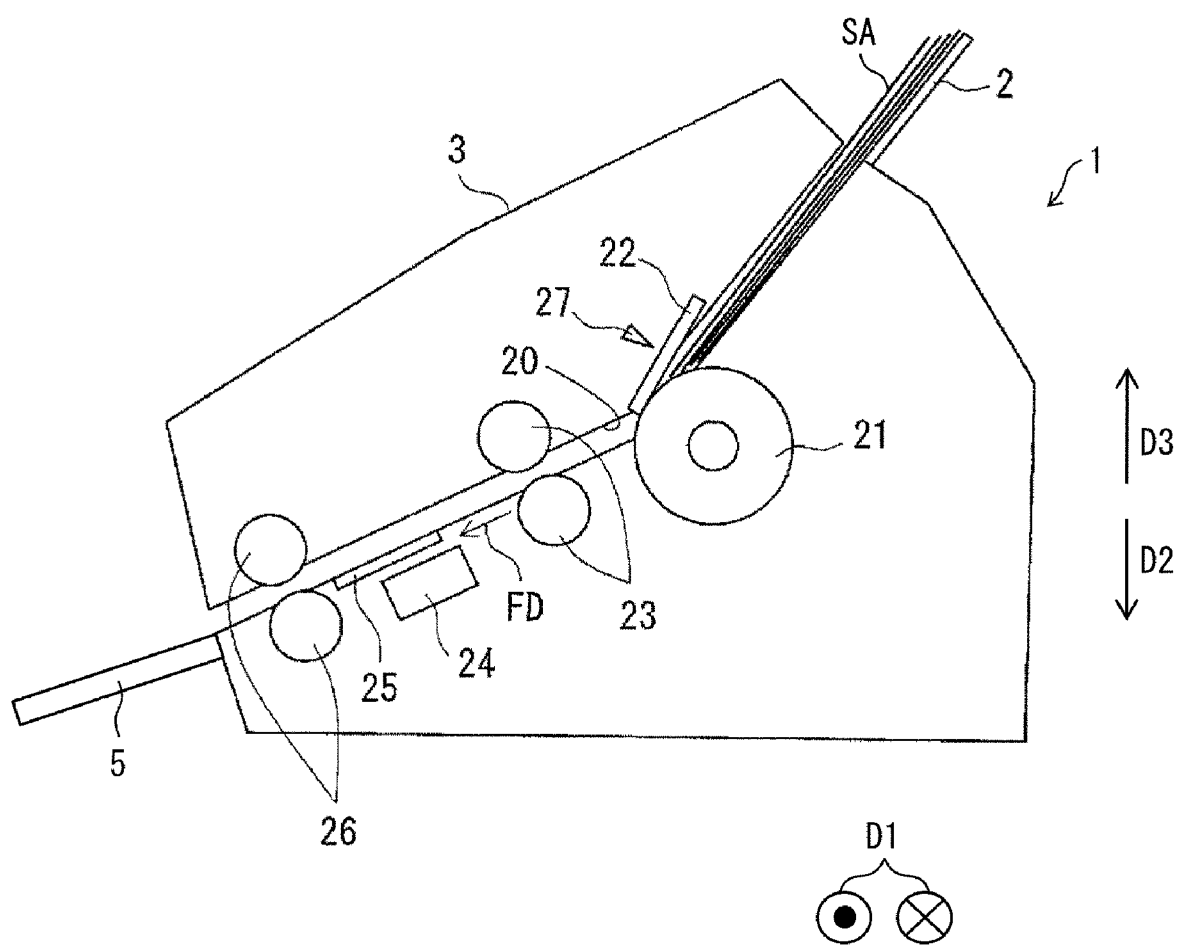
FIG. 2 is an illustrative view of an internal structure of the image processing apparatus.

FIG. 1A is a frontward perspective view of the image processing apparatus 1. FIG. 1B is a rearward perspective view of the image processing apparatus 1. FIG. 2 is an illustrative view of an internal structure of the image processing apparatus 1. The image processing apparatus 1 may be, for example, a scanner in an Auto-Document Feeder (ADF) style that may read an image of an original material SA automatically.

As shown in FIGS. 1A-1B, the image processing apparatus 1 includes an original material stand 2, a housing 3, an operation device 4, an ejection tray 5, a first communication interface 6, and a second communication interface 7. Moreover, as shown in FIG. 2 the image processing apparatus 1 includes conveyer rollers 21, 23, 26, a separator pad 22, an image-reading sensor 24, a platen glass 25, and a detecting sensor 27.

Configuration of Original Material Stand 2

The original material stand 2 is a stand, on which the original material SA may be placed. The original material SA may be placed on the original material stand 2 in an arrangement such that a center of the original material SA in a main scanning direction D1 coincides with a center of a supporting surface of the original material stand 2 in the main scanning direction D1. The original material SA may be inserted in an opening 31 formed in the housing 3 to be placed on the original material stand 2.

Configuration of Operation Device 4

Figure 3A:
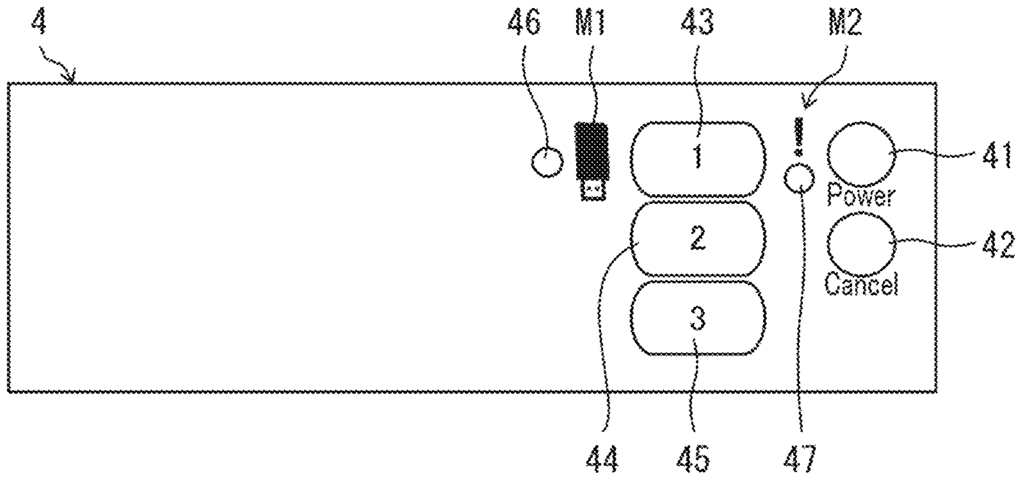
FIG. 3A is a front view of an operation device in the image processing apparatus.

FIG. 3A is a front view of the operation device 4 in the image processing apparatus 1. The operation device 4 is arranged on an outer surface of the housing 3. As shown in FIG. 3A, the operation device 4 includes a power key 41, a cancel key 42, a first key 43, a second key 44, a third key 45, a first light-emitting device 46, and a second light-emitting device 47.

The power key 41 is a key for powering the image processing apparatus 1 on and off. When a user presses the power key 41, a controller 11 may switch the power to the image processing apparatus 1 on or off. The controller 11 will be described later. The cancel key 42 is a key for canceling a predetermined action in the image processing apparatus 1. When the user presses the cancel key 42, the controller 11 may cancel the predetermined action in the image processing apparatus 1.

The first key 43, the second key 44, and the third key 45, which are examples of operation receiver, may receive predetermined operations from the user. The first key 43, the second key 44, and the third key 45 may receive pressing operations, which are examples of predetermined operations, from the user. To each of the first key 43, the second key 44, and the third key 45, a function to perform a predetermined imaging process may be assigned. For example, when the first key 43 is pressed by the user, the controller 11 may perform a predetermined imaging process assigned to the first key 43.

The functions to be assigned to the first key 43, the second key 44, and the third key 45 may be, for example, functions listed in Table 1 below. For example, according to Table 1, a function assigned to the first key 43 is a function to operate the image-reading sensor 24, when the first key 43 is pressed, to read an image of the original material SA and store image data composing the image having been read in a server outside the image processing apparatus 1. The image data to be stored composes a monochrome image, a resolution of the image data is 200 dpi, and a file format of the image data is PDF.

TABLE 1

| | Monochrome/ Multicolor | Resolution | File Format | Storage |
|---|---|---|---|---|
| First Key | Monochrome | 200 dpi | PDF | Server |
| Second Key | Multicolor | 300 dpi | JPEG | Email |
| Third Key | Multicolor | 600 dpi | JPEG | PC |

A function assigned to the second key 44 is a function to operate a PC 9, when the second key 44 is pressed, to activate a mail application software and display a screen for creating an email, to which the image data composing the image of the original material SA having been read by the image-reading sensor 24 is attached. The PC 9 will be described further below. A function assigned to the third key 45 is a function to operate the PC 9, when the first key 43 is pressed, to read an image of the original material SA and store image data composing the image having been read in the PC 9. To the second key 44 and the third key 45, similarly to the first key 43, settings of colors, resolutions, and file formats are provided.

The first light-emitting device 46 may emit light when a function to perform a second imaging process, which will be described later, is assigned to the first key 43. The second light-emitting device 47 may emit light when an error occurs in behaviors of the image processing apparatus 1. The first light-emitting device 46 and the second light-emitting device 47 may be, for example, light-emitting diodes (LEDs). In the vicinity of the first light-emitting device 46, a mark M1 is formed. The mark M1 may represent, for example, a Universal Serial Bus (USB) memory. In the vicinity of the second light-emitting device 47, a mark M2 representing an error is formed.

Configuration of Operation Device 4A

Figure 3B:
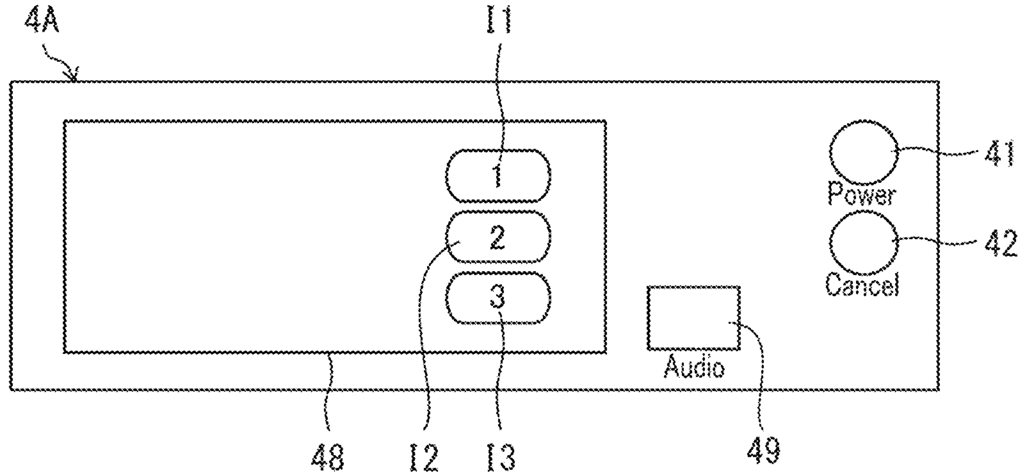
FIG. 3B is a front view of a modified example of the operation device in the image processing apparatus.

FIG. 3B is a front view of an operation device 4A being a modified example from the operation device 4. In other words, the image processing apparatus 1 may optionally have the operation device 4A in place of the operation device 4 shown in FIG. 3A. As shown in FIG. 3B, the operation device 4A is different from the operation device 4 in that the operation device 4A is not provided with the first key 43, the second key 44, the third key 45, the first light-emitting device 46, or the second light-emitting device 47 but is provided with a display 48 and an audio output device 49. Moreover, neither the mark M1 nor the mark M2 is formed in the operation device 4A.

The audio output device 49 may be, for example, a speaker that may produce sound indicating a predetermined type of information regarding the image processing apparatus 1. The display 48 may display description of a predetermined imaging process performed by the controller 11. The display 48 may include, for example, a liquid crystal display and a touch panel and may receive touching operations by the user. When the image processing apparatus 1 is powered on, the display 48 may display a first icon I1, a second icon 12, and a third icon I3.

The first icon I1, the second icon 12, and the third icon 13 being examples of operation receivers may receive predetermined operations by the user. For example, the first icon I1, the second icon 12, and the third icon 13 may receive touching operations by the user. The first icon I1, the second icon 12, and the third icon 13 may function substantially equally to the first key 43, the second key 44, and the third key 45, respectively.

Configurations of First Communication Interface 6 and Second Communication Interface 7

Figure 4:
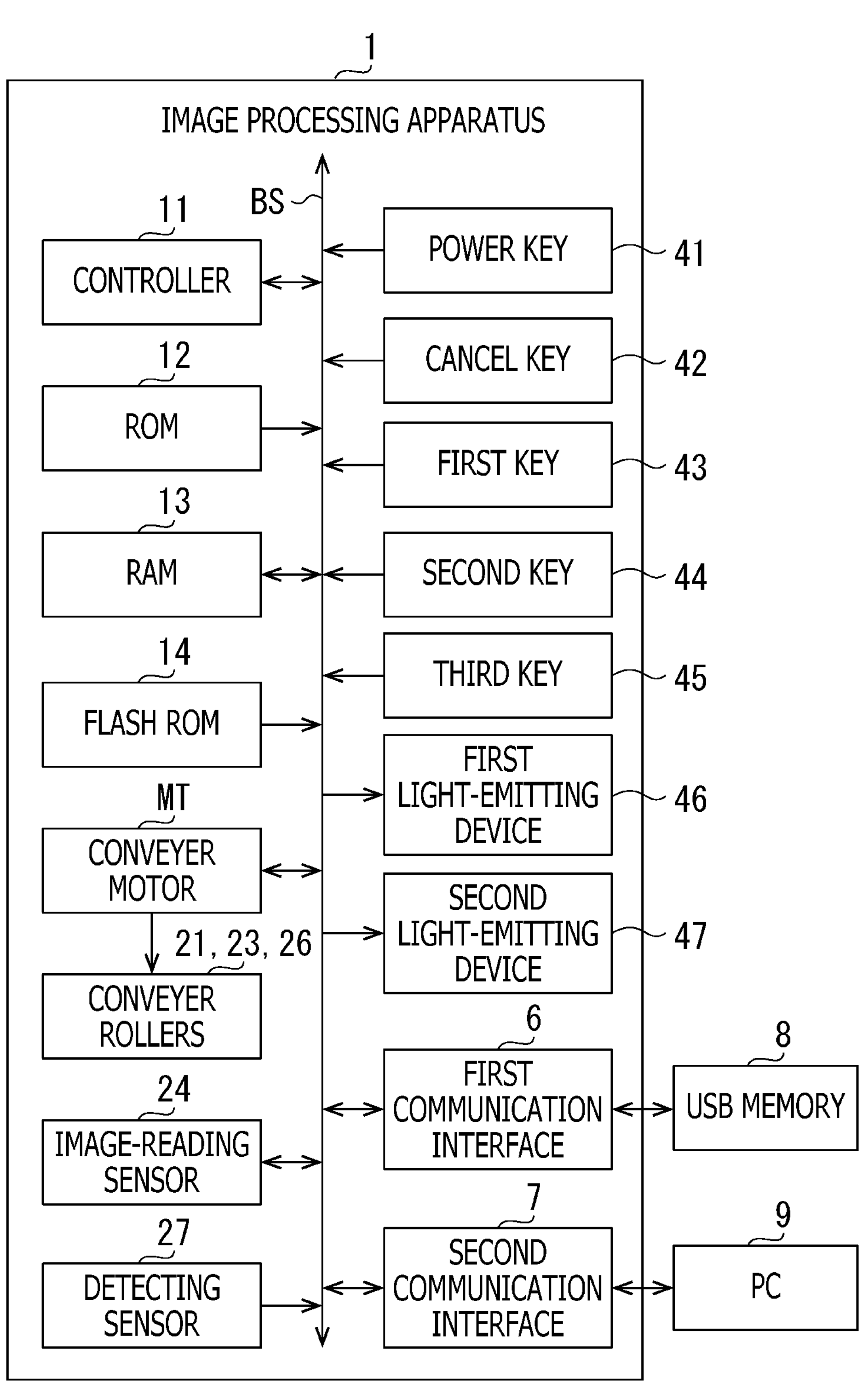
FIG. 4 is a block diagram to illustrate an electric configuration of the image processing apparatus.

As shown in FIG. 1B, on a rearward surface of the housing 3, the first communication interface 6 and the second communication interface 7 are arranged. The first communication interface 6 is connectable with an external device. The first communication interface 6 is connectable with the USB memory 8, which is an example of the external device, as shown in FIG. 4. In the following paragraphs, the USB memory 8 will represent the external device to be connected to the first communication interface 6. Meanwhile, the external device may not necessarily be limited to the USB memory 8 but may be, for example, SD card, microSD card, and a PC. SD and microSD are registered trademarks of SD-3C, LLC.

The second communication interface 7 is connectable with a communication apparatus. The second communication interface 7 is connectable with the PC 9, which is an example of the communication apparatus, as show in FIG. 4. In the following paragraphs, the PC 9 will represent the external device to be connected to the second communication interface 7. Optionally, the external device may be an external server of the image processing apparatus 1. Moreover, the first communication interface 6 and the second communication interface 7 may be devices that are in compliance with different communication standards such as LAN and Bluetooth. Bluetooth is a registered trademark of Bluetooth SIG, Inc.

Internal Configuration of Image Processing Apparatus 1

As shown in FIG. 2, a conveyer path 20 is formed inside the housing 3. The original material SA placed on the original material stand 2 may be conveyed in a conveying direction FD along the conveyer path 20 and ejected outside to rest on the ejection tray 5. The conveyer roller 21, the separator pad 22, a pair of conveyer rollers 23, the image-reading sensor 24, the platen glass 25, and a pair of conveyer rollers 26 are arranged along the conveyer path 20.

The conveyer roller 21 may feed a plurality of sheets of original material SA in conjunction with the separator pad 22. The conveyer rollers 21, 23, 26 may be driven by a conveyer motor MT as shown in FIG. 4. The platen glass 25 is made of a translucent material and is arranged along the conveyer path 20 at a position in a downward direction D2 with respect to the conveyer path 20. The conveyer rollers 23, 26 are located at central positions in the main scanning direction D1 in the conveyer path 20 and may convey the plurality of sheets of original material SA fed by the conveyer roller 21 one by one to pass through an area in an upward direction D3 with respect to the platen glass 25 at predetermined intervals.

The original material SA may be supported by the original material stand 2 in an arrangement such that surfaces of the sheets to be read by the image-reading sensor 24 face a supporting surface of the original material stand 2. The detecting sensor 27 may detect presence of the original material SA placed on the original material stand 2. The detecting sensor 27 may be, for example, an optical sensor or a physical sensor.

The optical sensor may have a light-receiving element and a light-emitting element. The light-emitting element may emit light at the light-receiving element, and the light-receiving element receiving the light from the light-emitting element may detect the presence of the original material SA. The physical sensor may have an actuator, which may be moved by the original material SA contacting the actuator, and the actuator being moved by the original material SA may detect the presence of the original material SA.

The image-reading sensor 24 is located at a position in the downward direction D2 with respect to the conveyer path 20. The image-reading sensor 24 may read the image of the readable surface of the original material SA, of which presence is detected by the detecting sensor 27, passing over the platen glass 25. The detecting sensor 27 is located in the vicinity of the original material stand 2. When the original material SA is supported by the original material stand 2, the detecting sensor 27 may be turned on, and when the original material stand 2 does not support the original material SA, the detecting sensor 27 may be turned off.

Electrical Configuration of Image Processing Apparatus 1

FIG. 4 is a block diagram to illustrate an electric configuration of the image processing apparatus 1. As shown in FIG. 4, the image processing apparatus 1 includes the controller 11, a Read Only Memory (ROM) 12, a Random Access Memory (RAM) 13, a flash ROM 14, and the conveyer motor MT. The controller 11 includes a Central Processing Unit (CPU).

The controller 11 is electrically connected with the ROM 12, the RAM 13, the flash ROM, the conveyer motor MT, the image-reading sensor 24, the detecting sensor 27, the power key 41, and the cancel key 42, through a bus BS. Moreover, the controller 11 is electrically connected with the first key 43, the second key 44, the third key 45, the first light-emitting device 46, the second light-emitting device 47, the first communication interface 6, and the second communication interface 7, through the bus BS.

The ROM 12 may store programs that may be run to cause the image processing apparatus 1 to perform actions. The controller 11 may control devices in the image processing apparatus 1 according to the programs called from the ROM 12. The RAM 13 may temporarily store information generated in the controlling processes run by the controller 11. The flash ROM 14 is a non-volatile rewritable memory and may store various types of data, such as data to be used in initialization, set by the controller 11 in the controlling processes.

Operations in Image Processing Apparatus 1

Figure 5:
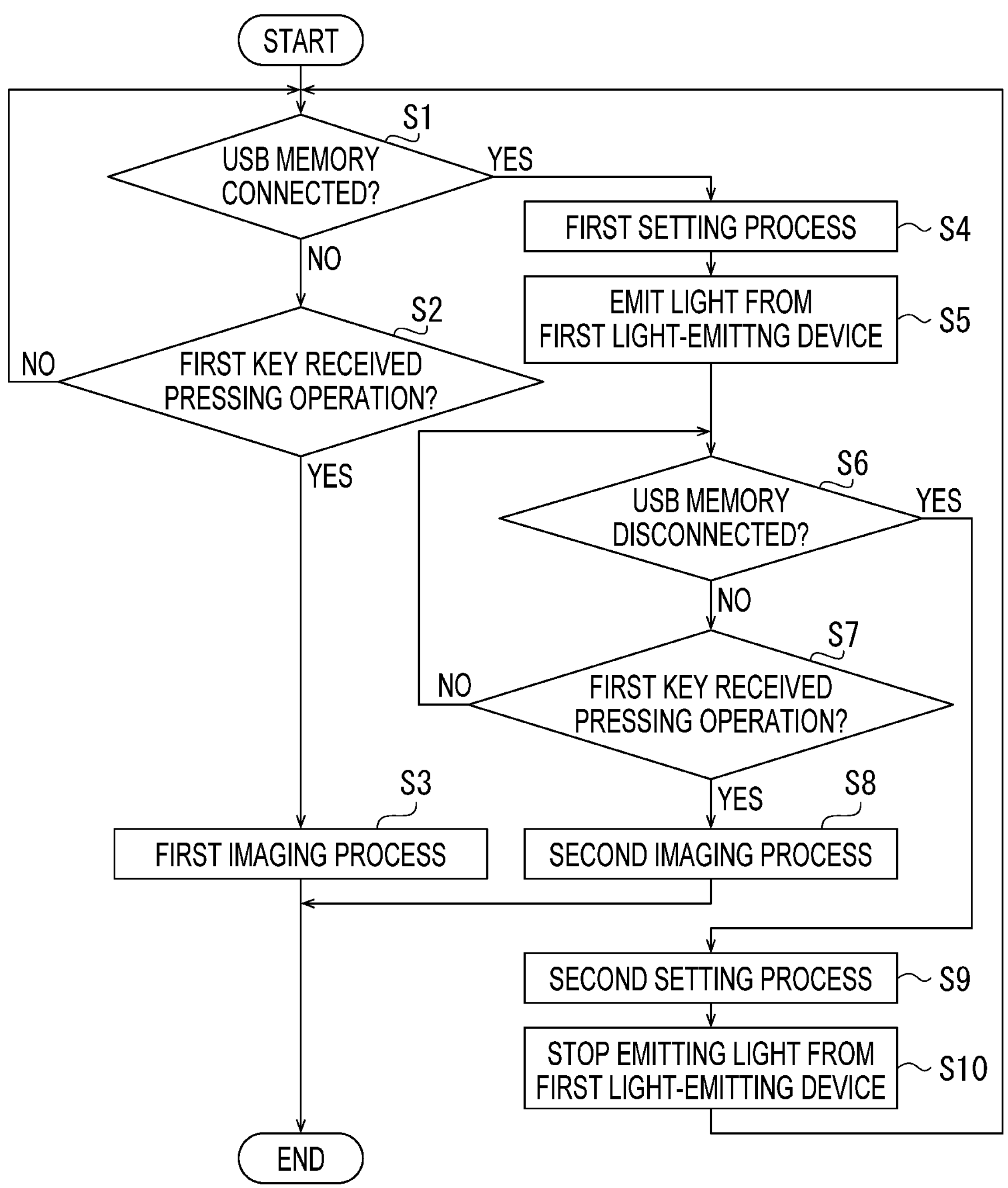
FIG. 5 is a flowchart to illustrate a flow of steps to be followed by a controller in the image processing apparatus.

FIG. 5 is a flowchart to illustrate a flow of steps to be followed by the controller 11 in the image processing apparatus 1. A method to process an image in the image processing apparatus 1 will be described below with reference to FIG. 5. The flow shown in FIG. 5 may start in response to an event either the image processing apparatus 1 is powered on or the image processing apparatus 1 wakes up from a sleep state and may be repeated while the power to the image processing apparatus 1 is maintained. In the paragraphs below, the first key 43 is an example of the subject whose functions are switched from one to another. However, the subject whose functions are switchable may not necessarily be limited to the first key 43, but the second key 44 and/or the third key 45 may be the subject whose functions are switchable from one to another.

As shown in FIG. 5, the controller 11 determines whether the USB memory 8 is connected to the first communication interface 6 (S1). In this context, the phrase "the USB memory 8 is connected to the first communication interface 6" may mean that an event to connect the USB memory 8 to the first communication interface 6 occurred and the first communication interface 6 is connected with the USB memory 8. If the controller 11 determines that the USB memory 8 is connected to the first communication interface 6 (S1: YES), the controller 11 performs a first setting process, which will be described below (S4). After the first setting process, the controller 11 controls the first light-emitting device 46 to emit light (S5).

In S1, the controller 11 may recognize that the device connected to the first communication interface 6 is the USB memory 8 by acquiring device information indicating a type of the device from the USB memory 8. Alternatively, the controller 11 may recognize that the device connected to the first communication interface 6 is the USB memory 8 automatically when a device is connected to the first communication interface 6. In other words, the first communication interface 6 may be an interface specifically limited to USB memories.

On the other hand, if the controller 11 determines that the USB memory 8 is not connected to the first communication interface 6 (S1: NO), the controller 11 determines whether the first key 43 received a pressing operation (S2). If the USB memory 8 is not connected to the first communication interface 6 (S1: NO), a function to perform a first imaging process is assigned to the first key 43. Therefore, if the controller 11 determines that the first key 43 received a pressing operation (S2: YES), the controller 11 performs the first imaging process (S3).

The first imaging process may be, for example, a process performed with use of the PC 9 connected to the second communication interface 7. In S3, the controller 11 performs the first imaging process including a first storing process, in which, for example, the controller 11 may control the image-reading sensor 24 to read an image of the original material SA and store image data composing the image having been read in the PC 9. Optionally, the first imaging process may be the same process as one of the processes shown in Table 1 assigned to the first key 43, the second key 44, and the third key 45.

After the first imaging process, the flow ends thereat. On the other hand, if the controller 11 determines the first key 43 received no pressing operation (S2: NO), the controller 11 returns to S1.

In S1, meanwhile, if the controller 11 determines that the USB memory 8 is connected to the first communication interface 6 (S1: YES), the controller 11 performs the first setting process in S4, in which a function to perform a second imaging process, in place of a function to perform the first imaging process, is assigned to the first key 43. The second imaging process will be described later.

Thus, the function assigned to the first key 43 may be switched from one to another based on the connection of the USB memory 8 with the first communication interface 6. Therefore, the functions of the first key 43 may be switched preferably at the time when the user desires to use the USB memory 8. Moreover, while the first key 43 may function in multiple ways, a number of keys to be provided to the image processing apparatus 1 may be reduced to a minimum number, and a size and a manufacturing cost of the image processing apparatus 1 may be reduced.

After the first setting process in S4, the controller 11 controls the first light-emitting device 46 to emit light (S5). In S5, the controller 11 may inform the user of the function currently assigned to the first key 43, i.e., the function to perform the second imaging process, by controlling the first light-emitting device 46 to emit light. The first light-emitting device 46 is an example of an indicator and may indicate the function to perform the second imaging process. Therefore, the user may recognize which function is currently assigned to the first key 43.

Optionally, the controller 11 may perform the first setting process in a case where the USB memory 8 is connected to the first communication interface 6 while the PC 9 is connected to the second communication interface 7. In this case, the controller 11 may disconnect, at least electrically, the PC 9 from the second communication interface 7.

In other words, the function assigned to the first key 43 may be switched from one to another in response to the connection of the USB memory 8 to the first communication interface 6 even when the second communication interface 7 is connected with the PC 9. Therefore, in the case where not only the PC 9 is connected to the second communication interface 7, but also the USB memory 8 is connected to the first communication interface 6, the function of the first key 43 may be switched from one to another at the time when the user desires to use the USB memory 8.

After the first light-emitting device 46 started emitting the light in S5, the controller 11 determines whether the USB memory 8 is disconnected from the first communication interface 6 (S6). If the controller 11 determines that the USB memory 8 is disconnected from the first communication interface 6 (S6: YES), the controller 11 performs a second setting process (S9), which will be described later. After the second setting process, the controller 11 controls the first light-emitting device 46 to stop emitting the light (S10).

Moreover, in S6, if the controller 11 determines that the USB memory 8 is disconnected from the first communication interface 6 (S6: YES), the controller 11 performs the second setting process (S9), in which a function to perform the first imaging process is assigned to the first key 43 in place of the second imaging process. Thus, in response to the disconnection of the USB memory 8 from the first communication interface 6, the function of the first key 43 is switched back from the function set in S4, i.e., function to perform the second imaging process, to the earlier function, i.e., function to perform the first imaging process. Therefore, the user may not need to manually switch the function of the first key 43 back to the function having been assigned to the first key earlier. After controlling the first light-emitting device 46 to stop emitting the light in S10, the flow returns to S1.

On the other hand, in S6, if the controller 11 determines that the USB memory 8 is not disconnected from the first communication interface 6 (S6: NO), in other words, if the USB memory 8 is maintained connected to the first communication interface 6, the controller 11 performs similarly to S2 (S7). If the controller 11 determines that the first key 43 received a pressing operation (S7: YES), the controller 11 performs the second imaging process (S8).

The second imaging process is a process different from the first imaging process and is performed with use of the USB memory 8. In S8, the controller 11 performs the second imaging process including a second storing process, in which, for example, the controller 11 may control the image-reading sensor 24 to read an image of the original material SA and store image data composing the image of the original material SA having been read in the USB memory 8.

Optionally, the controller 11 may perform the second imaging process, in which the controller 11 controls the USB memory 8 to recognize the PC 9 as a mass-storage device. In this arrangement, the controller 11 may store the image data in the PC 9 if a volume of the image data is larger than a volume available in the USB memory 8. In this arrangement, the controller 11 maintains the connection of the PC 9 to the second communication interface 7.

After the second imaging process, the flow ends thereat. On the other hand, if the controller 11 determines that the first key 43 received no pressing operation (S7: NO), the flow returns to S6.

Thus, when the USB memory 8 is not connected to the first communication interface 6 (S1: NO), in response to the predetermined operation received by the first key 43 (S2: YES), the controller 11 performs the first imaging process in S3. On the other hand, when the first communication interface 6 is connected with the USB memory (S1: YES), in response to the predetermined operation received by the first key 43 (S7: YES), the controller 11 performs the second imaging process in S8.

When the USB memory 8 is not connected to the first communication interface 6 (S1: NO), and in response to receiving of the predetermined operation (S2: YES), the image processing apparatus 1 may perform the first imaging process. When the USB memory 8 is connected to the first communication interface 6 (S1: YES), and in response to receiving of the predetermined operation (S7: YES), the image processing apparatus 1 may perform the second imaging process with use of the USB memory 8. Therefore, the user may operate the image processing apparatus 1 to perform the different imaging processes depending on the connecting condition of the first communication interface 6 with the USB memory 8 in response to the predetermined operation.

Second Embodiment

A second embodiment of the present disclosure will be described below. In the second embodiment, items and processes that are substantially similar to those in the first embodiment described above will be referred to by the same reference signs, and description of those will be herein omitted.

Figure 6A:
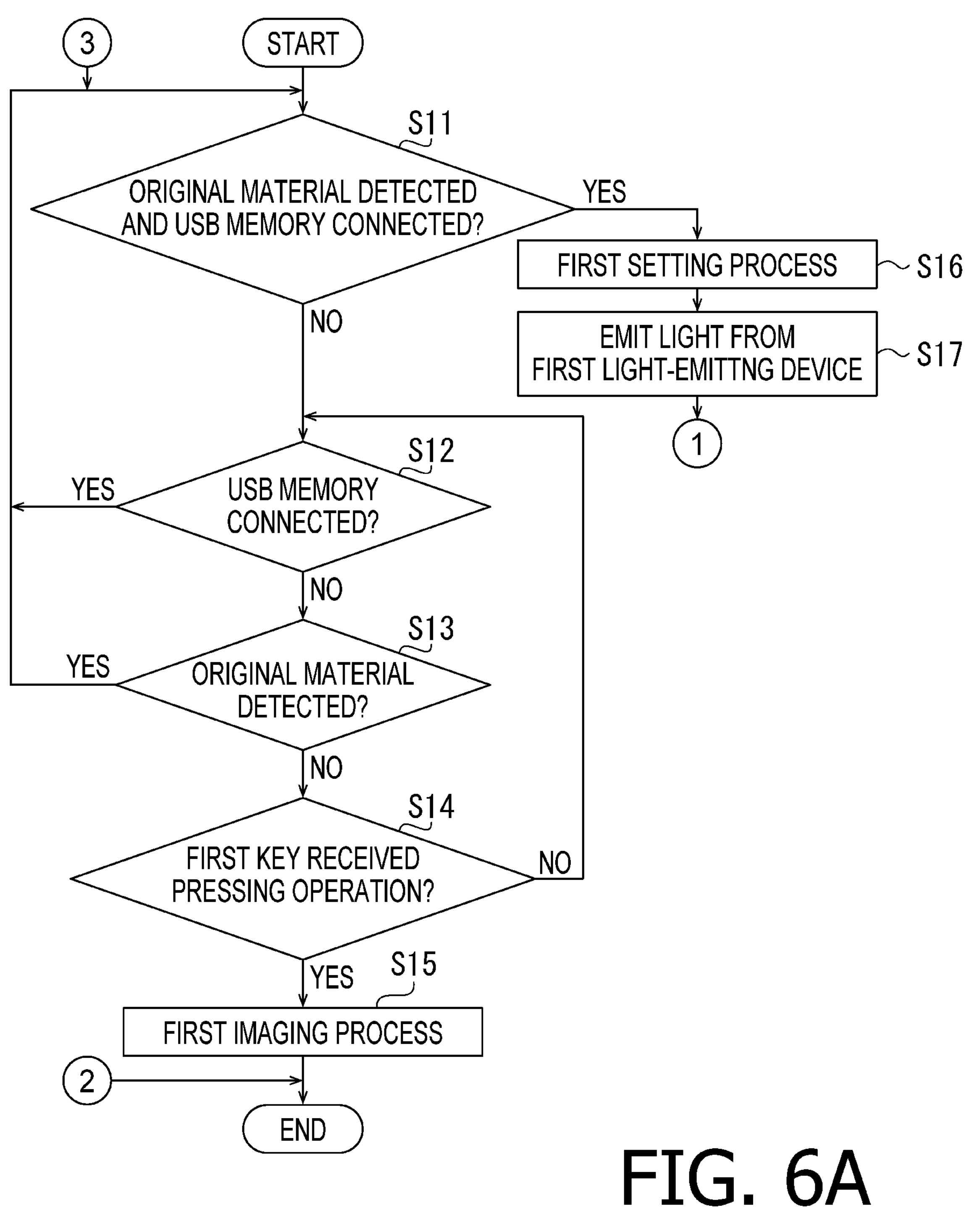
FIGS. 6A-6B are flowcharts to illustrate another flow of steps to be followed by the controller in the image processing apparatus.
Figure 6B:
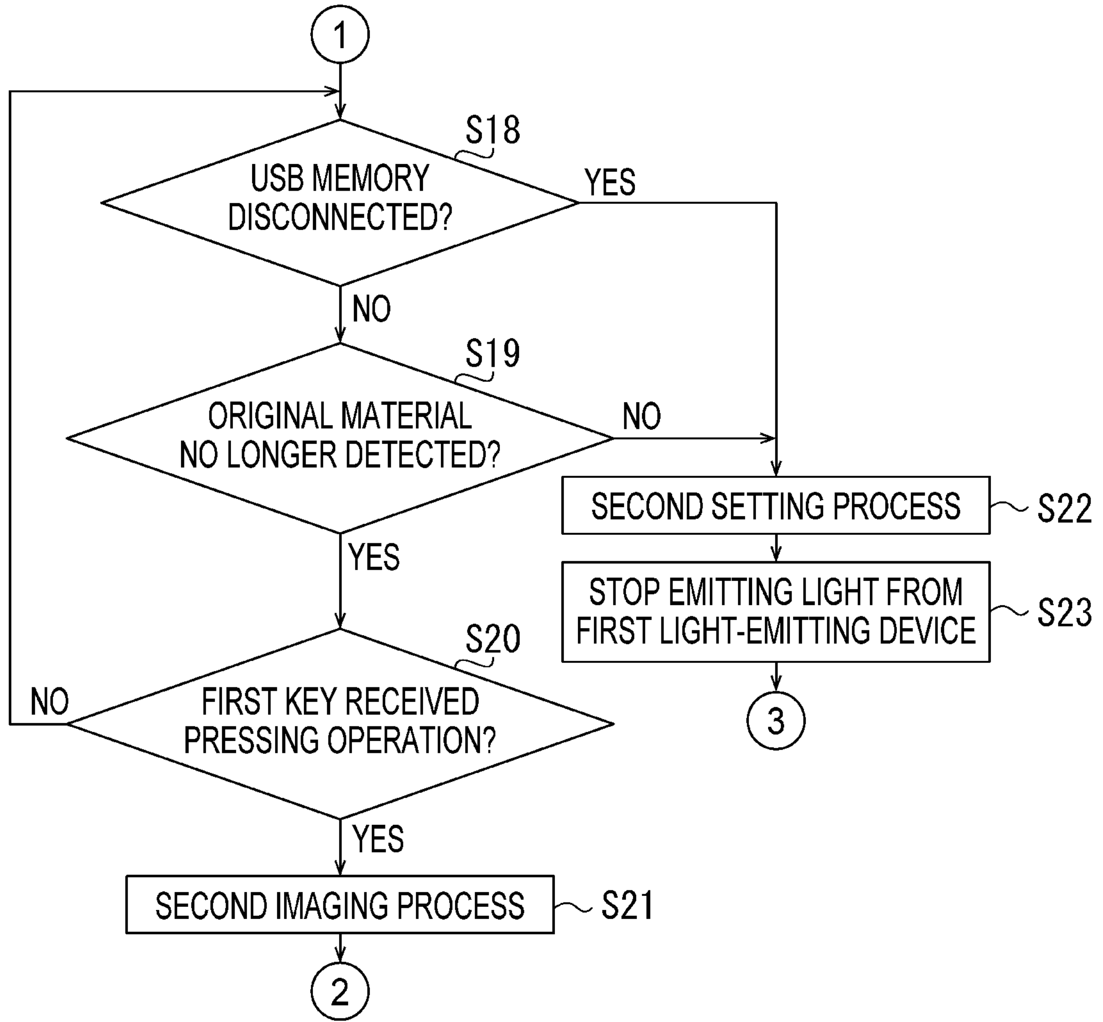

FIGS. 6A-6B are flowcharts to illustrate a flow of steps to be followed by the controller 11 in the image processing apparatus 1. The flow shown in FIGS. 6A-6B may start in response to an event either the image processing apparatus 1 is powered on or the image processing apparatus 1 wakes up from a sleep state and may be repeated while the power to the image processing apparatus 1 is maintained. As shown in FIGS. 6A-6B, the controller 11 determines whether the detecting sensor 27 detects presence of the original material SA and whether the USB memory 8 is connected to the first communication interface 6 (S11). If the controller 11 determines that the detecting sensor 27 detects presence of the original material SA and the USB memory 8 is connected to the first communication interface 6 (S11: YES), the controller 11 performs the first setting process (S16), similarly to S4 (see FIG. 5). After the first setting process in S4, the controller 11 controls the first light-emitting device 46 to emit light (S17).

In S11, if the controller 11 determines that the detecting sensor 27 detects presence of the original material SA, and in response to the USB memory 8 connected to the first communication interface 6 (S11: YES), the controller 11 performs the first setting process (S16). In the first setting process in S16, the controller 11 assigns a function to perform the second imaging process including the second storing process, in which the controller 11 may control the image-reading sensor 24 to read an image of the original material SA and store image data composing the image of the original material SA having been read in the USB memory 8, to the first key 43. Moreover, if the second communication interface 7 is connected with the PC 9 when the controller 11 determines that the detecting sensor 27 detects presence of the original material SA and the first communication interface 6 is connected with the USB memory 8 (S11: YES), the controller 11 disconnects the PC 9 from the second communication interface 7 at least electrically.

Thus, the function of the first key 43 may be switched from one to another in response to the connection of the USB memory 8 to the first communication interface 6 and detection of the presence of the original material SA. Therefore, the functions of the first key 43 may be switched preferably at the time when the user desires to use the image processing apparatus 1 for reading the image of the original material SA and storing the image data composing the image of the original material SA in the USB memory 8.

On the other hand, if at least one of the conditions of detecting the presence of the original material SA and connection of the USB memory 8 to the first communication interface 6 is not satisfied, in other words, if the detecting sensor 27 does not detect presence of the original material SA and/or the USB memory 8 is not connected to the first communication interface 6 (S11: NO), the controller 11 determines whether the USB memory 8 is connected to the first communication interface 6 (S12).

If the controller 11 determines that the USB memory 8 is connected to the first communication interface 6 (S12: YES), the flow returns to S11. If the controller 11 determines that the USB memory 8 is not connected to the first communication interface 6 (S12: NO), the controller 11 determines whether the detecting sensor 27 detects presence of the original material SA (S13). If the controller 11 determines that the USB memory 8 is not connected to the first communication interface 6 (S12: NO), similarly to the negative determination in S1 (see FIG. 5), the function currently assigned to the first key 43 is the function to perform the first imaging process.

If the controller 11 determines that the detecting sensor 27 detects presence of the original material SA (S13: YES), the flow returns to S11. If the controller 11 determines that the detecting sensor 27 does not detect presence of the original material SA (S13: NO), the controller 11 determines whether the first key 43 received a pressing operation (S14).

If the controller 11 determines that the first key 43 received a pressing operation (S14: YES), the controller 11 performs the first imaging process (S15). After the first imaging process, the flow ends thereat. On the other hand, if the controller 11 determines the first key 43 received no pressing operation (S14: NO), the flow returns to S12.

After the first light-emitting device 46 started emitting the light in S17, the controller 11 determines whether the USB memory 8 is disconnected from the first communication interface 6 (S18). If the controller 11 determines that the USB memory 8 is disconnected from the first communication interface 6 (S18: YES), the controller 11 performs the second setting process (S22), similarly to S9 (see FIG. 5).

After the second setting process, the controller 11 controls the first light-emitting device 46 to stop emitting the light (S23). Thereafter, the flow returns to S11.

In S18, if the controller 11 determines that the USB memory 8 is not disconnected from the first communication interface 6 (S18: NO), in other words, if the USB memory 8 is maintained connected to the first communication interface 6, the controller 10 determines whether the detecting sensor 27 no longer detects presence of the original material SA (S19). If the controller 11 determines that presence of the original material SA is no longer detected by the detecting sensor 27 (S19: NO), the flow proceeds to S22.

If the controller 11 determines that the detecting sensor 27 continuously detects presence of the original material SA (S19: YES), the controller 11 performs the same process as S14 (S20). If the controller 11 determines that the first key 43 received a pressing operation (S20: YES), the controller 11 performs the second imaging process (S21). After the second imaging process, the flow ends thereat. On the other hand, if the controller 11 determines the first key 43 received no pressing operation (S20: NO), the flow returns to S18.

Third Embodiment

A third embodiment of the present disclosure will be described below. In the third embodiment, items and processes that are substantially similar to those in the first and second embodiments described above will be referred to by the same reference signs, and description of those will be herein omitted.

Figure 7A:
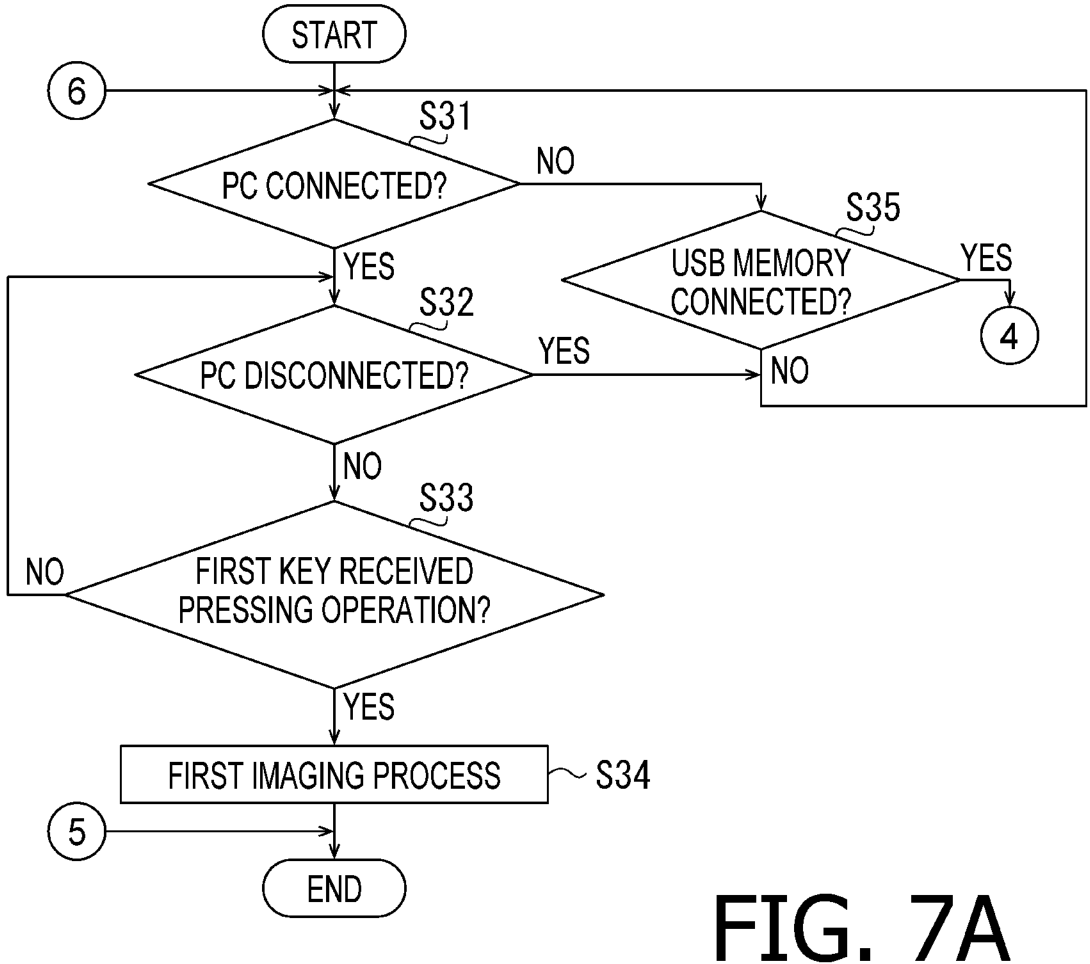
FIGS. 7A-7B are flowcharts to illustrate another flow of steps to be followed by the controller in the image processing apparatus.
Figure 7B:
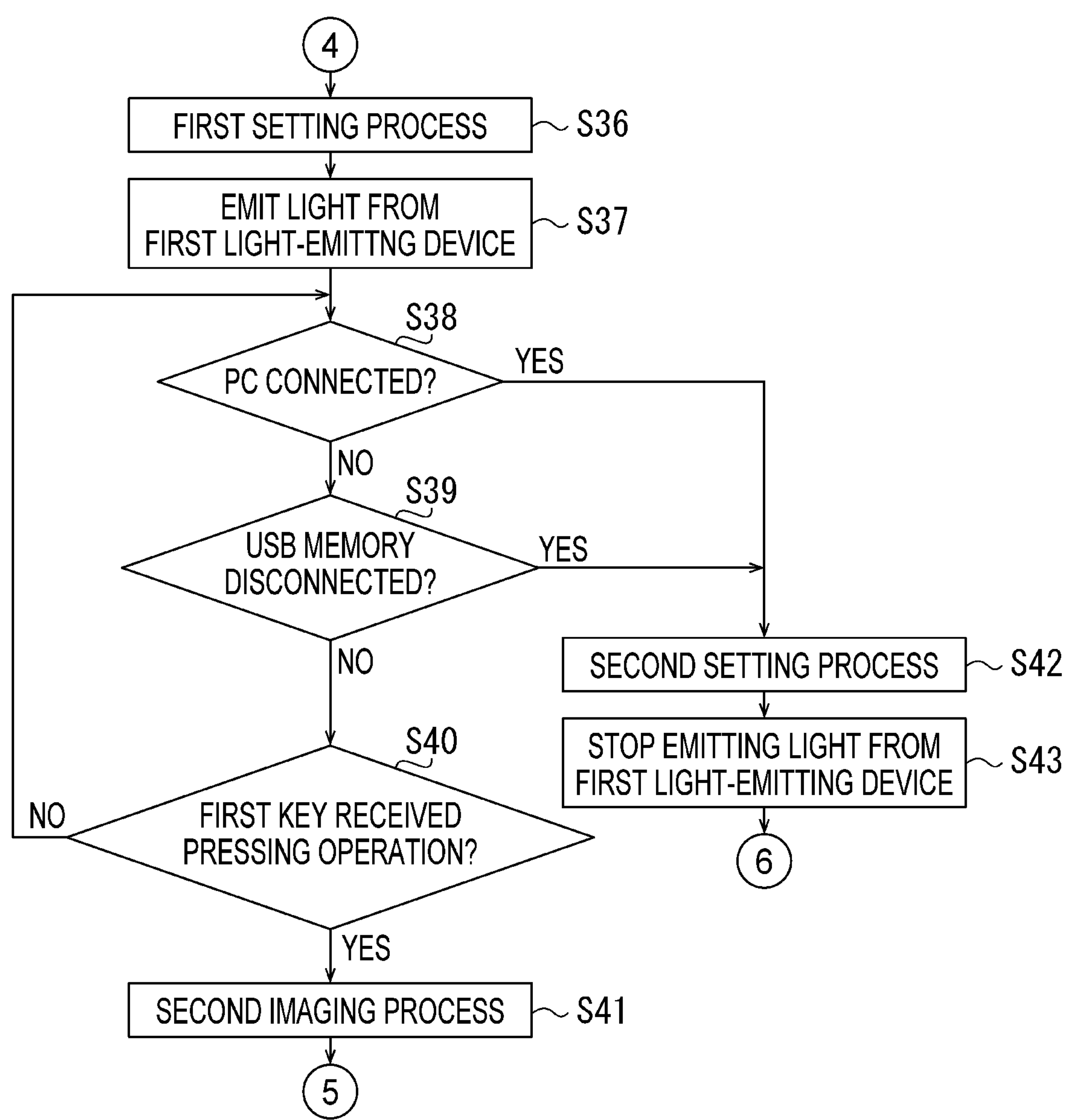

FIGS. 7A-7B are flowcharts to illustrate flows of steps to be followed by the controller 11 in the image processing apparatus 1. The flow shown in FIGS. 7A-7B may start in response to an event either the image processing apparatus 1 is powered on or the image processing apparatus 1 wakes up from a sleep state and may be repeated while the power to the image processing apparatus 1 is maintained. As shown in FIGS. 7A-7B, the controller 11 determines whether the PC 9 is connected to the second communication interface 7 (S31). In this context, the phrase "the PC 9 is connected to the second communication interface 7" may mean that an event to connect the PC 9 to the second communication interface 7 occurred and the second communication interface 7 is connected with the PC 9. If the controller 11 determines that the PC 9 is connected to the second communication interface 7 (S31: YES), the controller 11 determines whether the PC 9 is now disconnected from the second communication interface 7 (S32).

If the controller 11 determines that the PC 9 is connected to the second communication interface 7 (S31: YES), the controller 11 may recognize that the device connected to the second communication interface 7 is the PC 9 by acquiring device information indicating a type of the device from the PC 9. Alternatively, the controller 11 may recognize that the device connected to the second communication interface 7 is the PC 9 automatically when a device is connected to the second communication interface 7. In other words, the second communication interface 7 may be an interface specifically limited to PCs 9.

If the controller 11 determines that the PC 9 is disconnected from the second communication interface 7 (S32: YES), the flow returns to S31. On the other hand, if the controller 11 determines that the PC 9 is not disconnected from the second communication interface 7, in other words, if the PC 9 is maintained connected to the second communication interface 7 (S32: NO), the controller 11 determines whether the first key 43 received a pressing operation (S33).

If the controller 11 determines that the PC 9 is not disconnected from the second communication interface 7 (S32: NO), the controller 11 does not perform the first setting process. Therefore, the function assigned to the first key 43 to perform the first imaging process is maintained.

If the controller 11 determines that the first key 43 received a pressing operation (S33: YES), the controller 11 performs the first imaging process (S34). After the first imaging process, the flow ends thereat. If the controller 11 determines that the first key 43 did not receive a pressing operation (S33: NO), the flow returns to S32.

Meanwhile, in S31, if the controller 11 determines that the PC 9 is not connected to the second communication interface 7 (S31: NO), the controller 11 determines whether the USB memory 8 is connected to the first communication interface 6 (S35). If the controller 11 determines that the USB memory 8 is connected to the first communication interface 6 (S35: YES), the controller 11 performs the first setting process (S36), similarly to S4 (see FIG. 5). After the first setting process, the controller 11 controls the first light-emitting device 46 to emit light (S37).

In S35, if the controller 11 determines that the USB memory 8 is connected to the first communication interface 6 while the PC 9 is not connected to the second communication interface 7 (S35: YES), the controller 11 performs the first setting process.

After the first light-emitting device 46 started emitting the light in S37, the controller 11 performs the same process as S31 (S38). If the controller 11 determines that the PC 9 is connected to the second communication interface 7 (S38: YES), the controller 11 performs the second setting process (S42), similarly to S9 (see FIG. 5). After the second setting process, the controller 11 controls the first light-emitting device 46 to stop emitting the light (S43). Thereafter, the flow returns to S31.

In S38, if the controller 11 determines that the PC 9 is not connected to the second communication interface 7 (S38: NO), the controller 10 determines whether the USB memory 8 is disconnected from the first communication interface 6 (S39). If the controller 11 determines that the USB memory 8 is disconnected from the first communication interface 6 (S39: YES), the flow proceeds to S42.

If the controller 11 determines that the USB memory 8 is disconnected from the first communication interface 6 (S39: NO), the controller 11 performs the same process as S33 (S40). If the controller 11 determines that the first key 43 received a pressing operation (S40: YES), the controller 11 performs the second imaging process (S41). After the second imaging process, the flow ends thereat. If the controller 11 determines that the first key 43 did not receive a pressing operation (S40: NO), the flow returns to S38.

In S35, if the controller 11 determines that the USB memory 8 is not connected to the first communication interface 6 (S35: NO), the flow returns to S31. If the controller 11 determines that the USB memory 8 is not connected to the first communication interface 6 (S35: NO), similarly to the negative determination in S1 (see FIG. 5), the function assigned to the first key 43 is the function to perform the first imaging process.

Thus, if the controller 11 determines that the PC 9 is not disconnected from the second communication interface 7 (S32: NO), the first setting process is not performed; meanwhile, if the controller 11 determines that the USB memory 8 is connected to the first communication interface 6 (S35: YES), the first setting process is performed (S36). Therefore, in the image processing apparatus 1 having the first communication interface 6, to which the USB memory 8 is connectable, and the second communication interface 7, to which the PC 9 is connectable, depending on the connection condition of the PC 9 and/or the USB memory 8 to the second communication interface 7 and the first communication interface 6, the functions to be assigned to the first key 43 may be switched.

Fourth Embodiment

A fourth embodiment of the present disclosure will be described below. In the fourth embodiment, items and processes that are substantially identical to those in the first through third embodiments described above will be referred to by the same reference signs, and description of those will be herein omitted.

Figure 8:
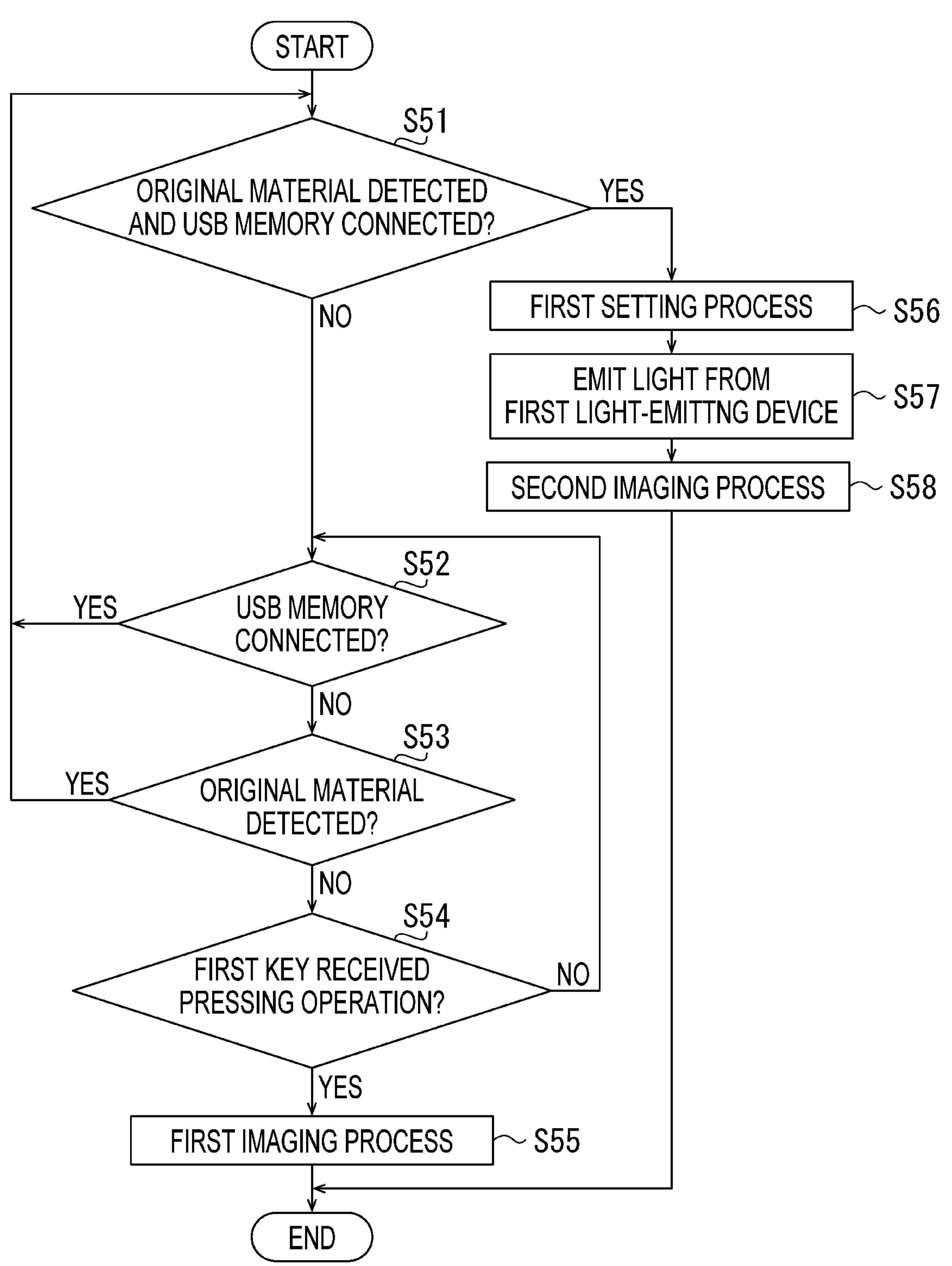
FIG. 8 is a flowchart to illustrate another flow of steps to be followed by the controller in the image processing apparatus.

FIG. 8 is a flowchart to illustrate a flow of steps to be followed by the controller 11 in the image processing apparatus 1. The flow shown in FIG. 8 may start in response to an event either the image processing apparatus 1 is powered on or the image processing apparatus 1 wakes up from a sleep state and may be repeated while the power to the image processing apparatus 1 is maintained. As shown in FIG. 8, the controller 11 determines whether the detecting sensor 27 detects presence of the original material SA and whether the USB memory 8 is connected to the first communication interface 6 (S51). If the controller 11 determines that the detecting sensor 27 detects presence of the original material SA and the USB memory 8 is connected to the first communication interface 6 (S51: YES), the controller 11 performs the first setting process (S56), similarly to S4 (see FIG. 5). After the first setting process in S56, the controller 11 controls the first light-emitting device 46 to emit light (S57). After the first light-emitting device 46 started emitting the light in S57, the controller 11 performs the second imaging process (S58). After the second imaging process in S58, the flow ends thereat.

In S51, if the controller 11 determines that the detecting sensor 27 detects presence of the original material SA, and in response to the USB memory 8 connected to the first communication interface 6, the controller 11 performs the first setting process in S56. Moreover, in the first setting process, the controller 11 assigns the function to perform the second imaging process including the second storing process, in which the controller 11 may control the image-reading sensor 24 to read an image of the original material SA and store image data composing the image of the original material SA having been read in the USB memory 8, to the first key 43.

On the other hand, if the detecting sensor 27 does not detect presence of the original material SA and/or the USB memory 8 is not connected to the first communication interface 6 (S51: NO), the controller 11 determines whether the USB memory 8 is connected to the first communication interface 6 (S52).

If the controller 11 determines that the USB memory 8 is connected to the first communication interface 6 (S52: YES), the flow returns to S51. If the controller 11 determines that the USB memory 8 is not connected to the first communication interface 6 (S52: NO), the controller 11 determines whether the detecting sensor 27 detects presence of the original material SA (S53). If the controller 11 determines that the USB memory 8 is not connected to the first communication interface 6 (S52: NO), similarly to the negative determination in S1 (see FIG. 5), the function currently assigned to the first key 43 is the function to perform the first imaging process.

If the controller 11 determines that the detecting sensor 27 detects presence of the original material SA (S53: YES), the flow returns to S51. If the controller 11 determines that the detecting sensor 27 does not detect presence of the original material SA (S53: NO), the controller 11 determines whether the first key 43 received a pressing operation (S54).

If the controller 11 determines that the first key 43 received a pressing operation (S54: YES), the controller 11 performs the first imaging process (S55). After the first imaging process, the flow ends thereat. On the other hand, if the controller 11 determines the first key 43 received no pressing operation (S54: NO), the flow returns to S52.

Fifth Embodiment

A fifth embodiment of the present disclosure will be described below. In the fifth embodiment, items and processes that are substantially identical to those in the first through fourth embodiments described above will be referred to by the same reference signs, and description of those will be herein omitted.

Figure 9:
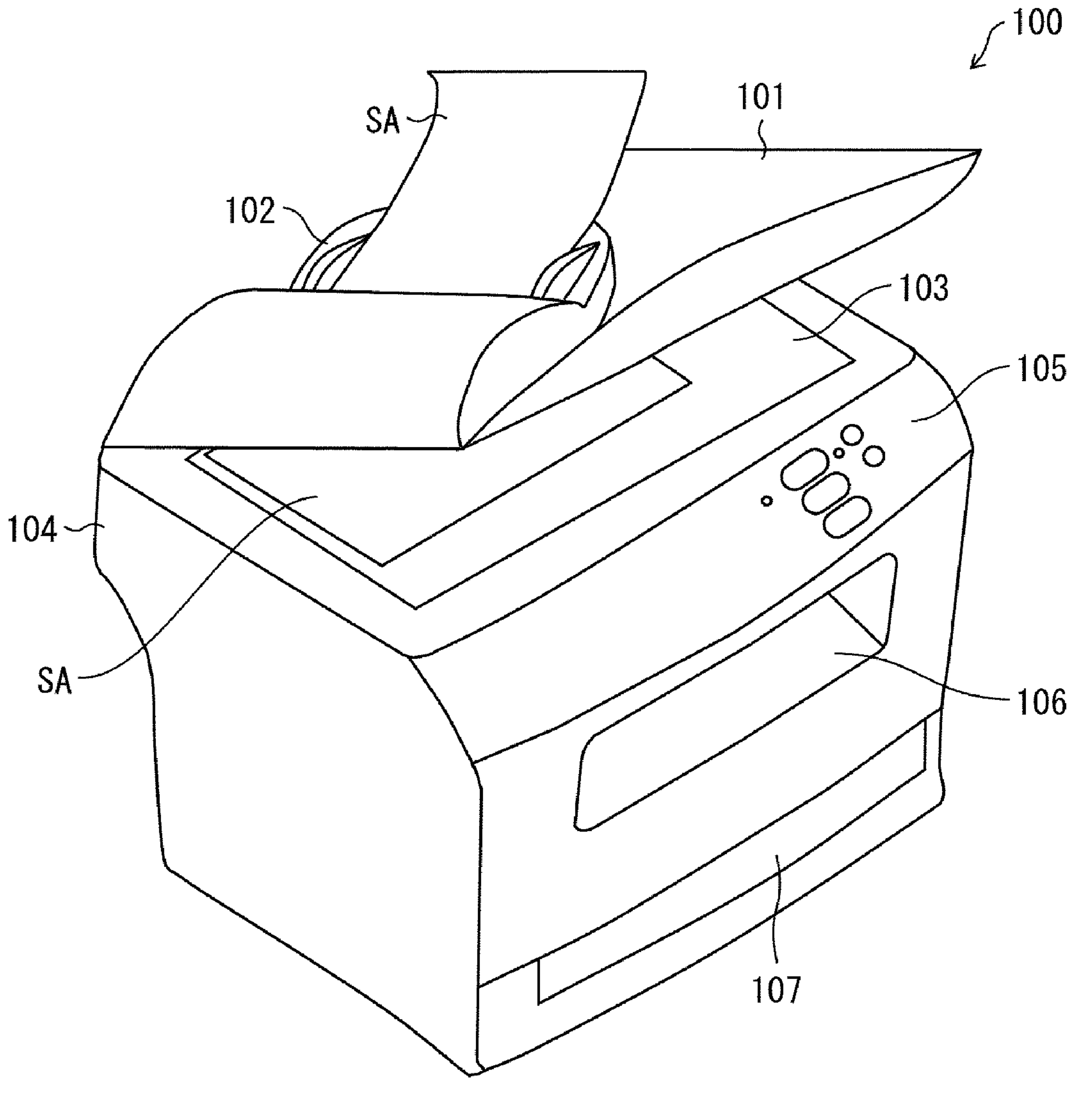
FIG. 9 is a perspective view of another image processing apparatus.
Figure 10:
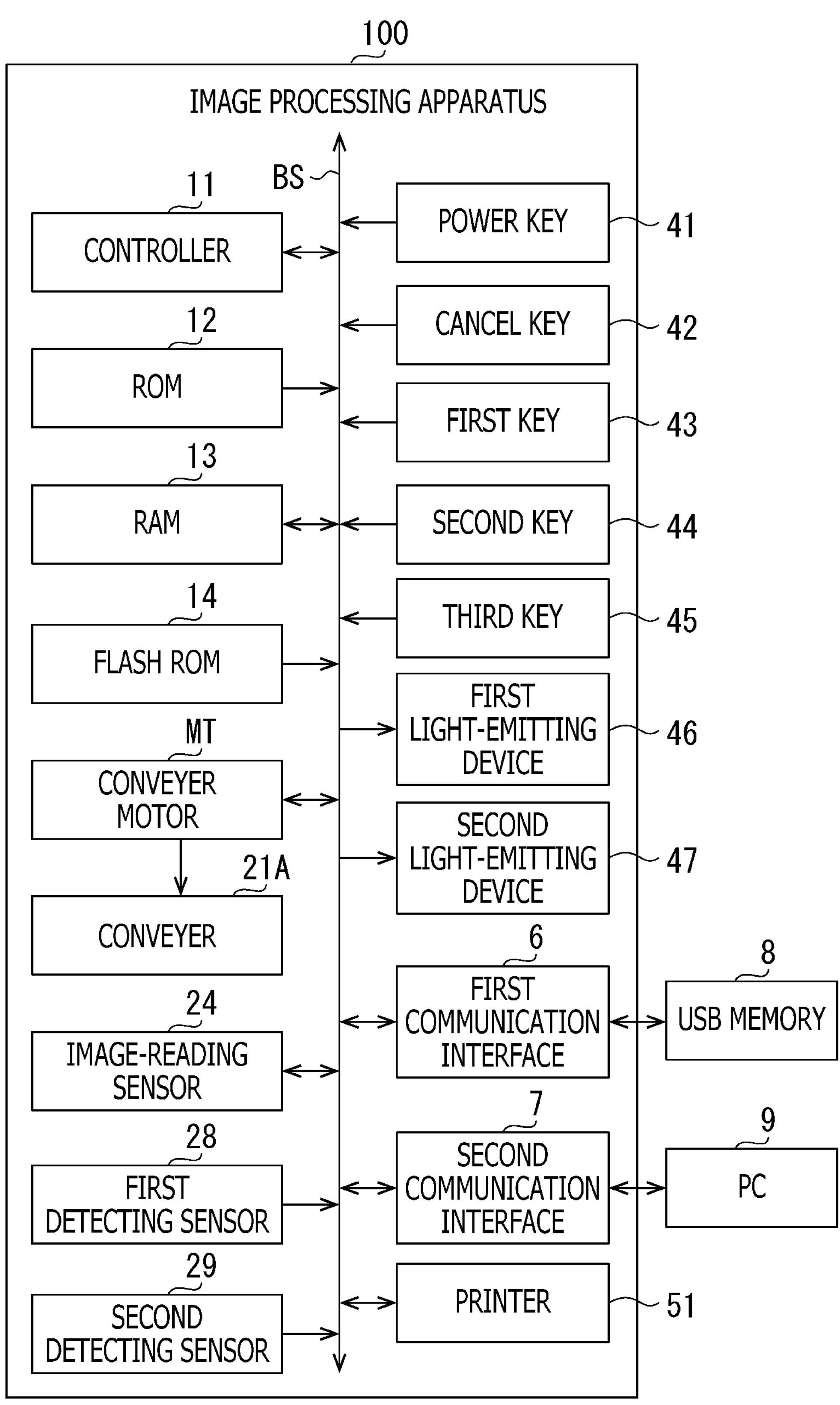
FIG. 10 is a block diagram to illustrate an electric configuration of the another image processing apparatus.

FIG. 9 is a perspective view of an image processing apparatus 100. FIG. 10 is a block diagram to illustrate an electric configuration of the image processing apparatus 100. The image processing apparatus 100 is a multifunction printer (MFP), having a plurality of functions including, for example, scanning, printing, copying, and facsimile transmission. The image processing apparatus 100 may read an image of the original material SA in one of a flatbed style and an ADF style selectively.

As shown in FIG. 9, the image processing apparatus 100 includes a cover 101, a first original material stand 102, a second original material stand 103, a housing 14, an operation device 105, an ejection tray 106, and a feeder tray 107. As shown in FIG. 10, the image processing apparatus 100 is different from the image processing apparatus 1 in that the conveyer rollers 21, 23, 26 are replaced with a conveyer 21A, the image processing apparatus 100 includes a printer 51, and the detecting sensor 27 is replaced with a first detecting sensor 28 and a second detecting sensor 29.

The cover 101 covers an upper surface of the housing 104 and is movably supported by the housing 14 to open and close the upper surface of the housing 104. The first original material stand 102 is arranged in the cover 101, and the second original material stand 103 is arranged on the upper surface of the housing 104. The first original material stand 102 and the second original material stand 103 are stand and table, on which the original material SA may be placed. The first original material stand 102 is provided to a scanner that may read an image of the original material SA in the ADF style, and the second original material stand 103 is provided to a scanner that may read an image of the original material SA in the flatbed style.

The operation device 105 is in the substantially same configuration as the operation device 4 and includes the power key 41, the cancel key 42, the first key 43, the second key 44, the third key 45, the first light-emitting device 46, and the second light-emitting device 47. The ejection tray 106 may accommodate sheets ejected by the conveyer 21A. The feeder tray 107 may store sheets to be used in printing images by the printer 51.

The printer 51 is located inside the housing 104 and may print an image on the sheet. The printer 51 is, if the image processing apparatus 100 is equipped with a laser printer, a printing device forming the laser printer, or, if the image processing apparatus 100 is equipped with an inkjet printer, a printing device forming the inkjet printer. The first detecting sensor 28 may detect presence of the original material SA placed on the first original material stand 102. The second detecting sensor 29 may detect presence of the original material SA placed on the second original material stand 103.

In the image processing apparatus 100, the controller 11 may control the conveyer 21A to feed the sheets stored in the feeder tray 107 to the printer 51 by driving the conveyer motor MT. The controller 11 may control the printer 51 to print images on the sheets conveyed by the conveyer 21A. The controller 11 may control the conveyer 21A to eject the sheets with the images printed thereon by the printer 51 at the ejection tray 106.

Optionally, in S11, S13, S19 in FIGS. 6A-6B and S51, S53 in FIG. 8, the controller 11 may determine whether the first detecting sensor 28 or the second detecting sensor 29 detects presence of the original material SA.

Optionally, further, in the first setting process in S4 (see FIG. 5) and S36 (see FIG. 7B) in the first and third embodiments described above, the controller 11 may assign a function to perform a second imaging process including a printing process in response to connection of the USB memory 8 to the first communication interface 6 to the first key 43. The printing process is a process, in which the controller 11 operates the printer 51 to print an image with use of image data acquired from the USB memory 8. The functions of the first key 43 may be switched depending on the connection condition of the USB memory 8; therefore, the functions of the first key 43 may be switched preferably at the time when the user desires to use the USB memory 8.

Optionally, further, in the first setting process in S16 (see FIG. 6A) and S56 (see FIG. 8) in the second and fourth embodiments described above, the controller 11 may assign a function to perform the second imaging process including the printing process to the first key 43 in response to connection of the USB memory 8 and not detecting presence of the original material SA. In particular, the function to read the image with use of the USB memory 8 may be assigned to the first key 43 in response to the USB memory 8 connected to the first communication interface 6 and detection of the presence of the original material SA, and the function to print an image with use of the USB memory 8 may be assigned to the first key 43 in response to the USB memory 8 connected to the first communication interface 6 and not detecting presence of the original material SA. Thus, the functions of the first key 43 may be switched depending on the connection condition of the USB memory 8 and presence of the original material SA; therefore, the functions of the first key 43 may be switched preferably at the time when the user desires to read or print an image with use the USB memory 8.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

First Modified Example

For example, in the first through fourth embodiments, the controller 11 may start the flows shown in FIGS. 5-8 in response to an event either the image processing apparatus 1 is powered on or the image processing apparatus 1 wakes up from a sleep state after the event to connect the USB memory 8 occurred and while the USB memory 8 is in a connected state with the first communication interface 6. The sleep state may be a state, in which a number of parts to supply the power among the parts included in the image processing apparatus 1 is smaller than in a standby state, in which the controller 11 waits for instructions to perform the first imaging process or the second imaging process.

In this arrangement, not only when an event to connect the USB memory 8 occurs, but also when the USB memory 8 is in a connected condition, the functions of the first key 43 may be switched in response to the power-on event or waking up from the sleep state.

In the fifth embodiment, optionally, the controller 11 may perform the first setting process in response to an either event that the image processing apparatus 1 is powered on or the image processing apparatus 1 wakes up from a sleep state while the USB memory 8 is connected to the first communication interface 6.

Second Modified Example

For another example, in the first through fourth embodiments, when the function to perform the first imaging process is assigned to the first key 43, the controller 11 may control the display 48 (see FIG. 3B) to display information indicating that the function currently assigned to the first key 43 is the function to perform the first imaging process.

Optionally, the controller 11 may switch the contents to be displayed in the display 48 after the first setting process. For example, the controller 11 may switch the contents indicating that the function to perform the first imaging process is currently assigned to the first key 43 to the contents indicating that the function to perform the second imaging process is currently assigned to the first key 43. The display 48 is an example of indicator that may indicate the function currently assigned to the first key 43 is either the function to perform the first imaging process or the function to perform the second imaging process.

Optionally, further, when the function to perform the first imaging process is currently assigned to the first key 43, the controller 11 may output sound indicating that the function to perform the first imaging process is currently assigned to the first key 43 at a predetermined time from the audio output device 49 (see FIG. 3B). The controller 11 may output sound indicating that the function to perform the second imaging process is currently assigned to the first key 43 after the first setting process from the audio output device 49. The audio output device 49 is an example of indicator that may indicate the function currently assigned to the first key 43 is either the function to perform the first imaging process or the function to perform the second imaging process.

Third Modified Example

For another example, in the fifth embodiment, the operation device 105 may be in the same configuration as the operation device 4A. When the function to perform the second imaging process including the printing process is assigned to the first key 43, the controller 11 may display image data stored in the USB memory 8 when the controller 11 determines that the first key 43 received a pressing operation. For example, a plurality of units of image data stored in the USB memory 8 may be displayed, and the user may touch the display 48 to select one of the plurality of units of image data.

When the user selects one of the plurality of units of image data stored in the USB memory 8 displayed on the display 48, the controller 11 may control the printer 51 to print an image composed of the selected image data on the sheet in the printing process.

Examples of Implementation by Software

The functions of the image processing apparatuses 1, 100 may be implemented by a program that enables a computer to function as the image processing apparatuses 1, 100 and that enables the computer to function as the controller 11.

According to this configuration, the image processing apparatuses 1, 100 are each equipped with a computer, as a hardware device to run the program, having at least one controller, e.g., a processor, and at least one storage device, e.g., a memory. By running the program on the controller and the storage device, the functions of the image processing apparatuses 1, 100 as described above in the embodiments may be implemented.

The program may be stored in one or more non-transitory computer-readable recording media. The recording media may or may not be provided to the image processing apparatuses 1, 100. If the recording media is not provided to the image processing apparatuses 1, 100, the program may be delivered to the image processing apparatuses 1, 100 through any transmission medium in wires or wirelessly.

For another example, a part or all of the functions of the controller 11 may be implemented by a logic circuit. For example, an integrated circuit, in which a logic circuit functioning as the controller 11 is formed, may be included in the scope of the present disclosure. For another example, the functions of the controller 11 may be implemented by a quantum computer.

What is claimed is:

1. An image processing apparatus, comprising:

a user interface disposed on a housing of the image processing apparatus, the user interface being configured to receive a predetermined operation;

a first communication interface connectable with an external device;

a second communication interface connectable with a communication device; and a controller configured to:

in response to the user interface receiving the predetermined operation when the first communication interface is not connected with the external device, the user interface being linked to a function to perform a first imaging process in a state where the first communication interface is not connected with the external device, perform the first imaging process;

in response to connection of the first communication interface with the external device when the second communication interface is connected with the communication device, switch linkage of the user interface to a function to perform a second imaging process in exchange for the function to perform the first imaging process, the second imaging process being different from the first imaging process; and in response to the user interface receiving the predetermined operation when the first communication interface is connected with the external device, perform the second imaging process using the external device.

2. The image processing apparatus according to claim 1, wherein the controller is configured to, in response to disconnection of the first communication interface from the external device, switch the linkage of the user interface to the function to perform the first imaging process in exchange for the function to perform the second imaging process.

3. The image processing apparatus according to claim 1, further comprising:

an original material stand, on which an original material is to be placed;

a detecting sensor configured to detect the original material placed on the original material stand; and an image-reading sensor configured to read an image of the original material detected by the detecting sensor, wherein the controller is configured to, in response to the detecting sensor detecting the original material and when the first communication interface is connected with the external device, perform the second imaging process including a storing process in which the controller stores image data composing the image of the original material having been read by the image-reading sensor in the external device.

4. The image processing apparatus according to claim 1, further comprising a printer configured to print an image on a sheet, wherein the second imaging process includes a printing process in which the controller causes the printer to print an image based on image data obtained from the external device.

5. The image processing apparatus according to claim 1, wherein the controller is configured to, in response to one of an event that the image processing apparatus is powered on and an event that the image processing apparatus wakes up from a sleep state when the first communication interface is connected with the external device and when the second communication interface is connected with the communication device, switch the linkage of the user interface to the function to perform the second imaging process in exchange for the function to perform the first imaging process.

6. The image processing apparatus according to claim 1, wherein, when the first communication interface is not connected with the external device, the function to perform the first imaging process is linked to the user interface.

7. The image processing apparatus according to claim 1, wherein the first imaging process is linked to the user interface in advance as a short-cut.

8. The image processing apparatus according to claim 1, further comprising an indicator configured to indicate a function currently linked to the user interface.

9. An image processing apparatus, comprising:

a user interface disposed on a housing of the image processing apparatus, the user interface being configured to receive a predetermined operation;

a first communication interface connectable with an external device;

a second communication interface connectable with a communication device; and a controller configured to:

in response to the user interface receiving the predetermined operation when the first communication interface is not connected with the external device, the user interface being linked to a function to perform a first imaging process in a state where the first communication interface is not connected with the external device, perform the first imaging process using the communication device;

in response to connection of the first communication interface with the external device when the second communication interface is not connected with the communication device, switch linkage of the user interface to a function to perform a second imaging process in exchange for the function to perform the first imaging process, the second imaging process being different from the first imaging process;

in response to connection of the first communication interface with the external device when the second communication interface is connected with the communication device, maintain the linkage of the user interface to the function to perform the first imaging process; and in response to the user interface receiving the predetermined operation when the first communication interface is connected with the external device and when the second communication interface is not connected with the communication device, perform the second imaging process using the external device.

10. The image processing apparatus according to claim 9, wherein the controller is configured to, in response to disconnection of the first communication interface from the external device, switch the linkage of the user interface to the function to perform the first imaging process in exchange for the function to perform the second imaging process.

11. The image processing apparatus according to claim 9, further comprising a printer configured to print an image on a sheet, wherein the second imaging process includes a printing process in which the controller causes the printer to print an image based on image data obtained from the external device.

12. The image processing apparatus according to claim 9, wherein, in response to one of an event that the image processing apparatus is powered on and an event that the image processing apparatus wakes up from a sleep state, the controller is configured to determine which one of the functions is linked to the user interface.

13. The image processing apparatus according to claim 9, further comprising an indicator configured to indicate a function currently linked to the user interface.

14. The image processing apparatus according to claim 9, wherein the first imaging process is linked to the user interface in advance as a short-cut.

15. An image processing apparatus, comprising:

a user interface disposed on a housing of the image processing apparatus, the user interface being configured to receive a predetermined operation;

a first communication interface connectable with an external device;

an indicator provided separately from the user interface, the indicator being configured to indicate a predetermined notification; and a controller configured to:

in response to the user interface receiving the predetermined operation when the first communication interface is not connected with the external device, the user interface being linked to a function to perform a first imaging process in a state where the first communication interface is not connected with the external device, perform the first imaging process;

in response to connection of the first communication interface with the external device, switch linkage of the user interface to a function to perform a second imaging process in exchange for the function to perform the first imaging process, the second imaging process being different from the first imaging process;

in response to the user interface receiving the predetermined operation when the first communication interface is connected with the external device, perform the second imaging process using the external device; and control the indicator to indicate the function currently linked to the user interface.

16. The image processing apparatus according to claim 15, wherein the indicator is a light emitting diode.

* * * * *